United States Patent
Spiegl et al.

(10) Patent No.: US 10,753,240 B2
(45) Date of Patent: Aug. 25, 2020

(54) LUBRICATION SYSTEM FOR PISTON MACHINES

(71) Applicant: Hoerbiger Wien GmbH, Vienna (AT)

(72) Inventors: Bernhard Spiegl, Vienna (AT);
Matthias Kornfeld, Mödling (AT);
Jonathan Gauster, Vienna (AT);
Bernhard Fritz, Vienna (AT)

(73) Assignee: Hoerbiger Wien GmbH, Vienna (AT)

( * ) Notice: Subject to any disclaimer, the term of this patent is extended or adjusted under 35 U.S.C. 154(b) by 153 days.

(21) Appl. No.: 15/684,538

(22) Filed: Aug. 23, 2017

(65) Prior Publication Data
US 2018/0058278 A1 Mar. 1, 2018

(30) Foreign Application Priority Data

Aug. 25, 2016 (AT) .................. A50763/2016

(51) Int. Cl.
| | |
|---|---|
| *F01M 1/16* | (2006.01) |
| *F01M 1/08* | (2006.01) |
| *F01M 1/18* | (2006.01) |
| *F01M 11/02* | (2006.01) |

(52) U.S. Cl.
CPC .............. *F01M 1/16* (2013.01); *F01M 1/08* (2013.01); *F01M 1/18* (2013.01); *F01M 11/02* (2013.01); *F16N 2270/20* (2013.01)

(58) Field of Classification Search
CPC ........ F01M 1/16; F01M 1/18; F16N 2250/06; F16N 2260/05
See application file for complete search history.

(56) References Cited

U.S. PATENT DOCUMENTS

| | | | | |
|---|---|---|---|---|
| 4,475,407 A | * | 10/1984 | Kruncos | G01P 13/002 340/606 |
| 4,496,287 A | * | 1/1985 | Nelson | F04B 17/046 417/417 |
| 4,747,300 A | * | 5/1988 | Nelson | F04B 17/046 137/391 |
| 5,275,539 A | * | 1/1994 | Custer, Jr. | F01M 1/16 123/452 |

(Continued)

FOREIGN PATENT DOCUMENTS

| | | |
|---|---|---|
| DE | 10149125 A1 | 4/2003 |
| DE | 102014205975 A1 | 10/2015 |

(Continued)

OTHER PUBLICATIONS

European Search Report Patent No. 17187518.0 Completed Date: Jan. 10, 2018; dated Jan. 17, 2018 5 pages.

(Continued)

*Primary Examiner* — Minh Truong
(74) *Attorney, Agent, or Firm* — Whitmyer IP Group LLC (57) ABSTRACT

An invention refers to a lubricant injector, a lubrication system and a method for providing lubricant for a piston machine. The lubricant injector is provided with a lubricant inlet conduit and an outlet opening, through which a lubricant is supplied to an inner space to be lubricated of a piston machine. The outlet opening may be selectively opened and closed by means of a needle valve, which is actuated by a magnet coil. The lubricant injector has a flow sensor suitable for determining the quantity of lubricant delivered through the outlet opening.

23 Claims, 5 Drawing Sheets

(56) References Cited

U.S. PATENT DOCUMENTS

| | | | | |
|---|---|---|---|---|
| 5,747,702 A * | 5/1998 | Kadlicko | ............... | G01D 3/022 |
| | | | | 73/861.53 |
| 5,904,126 A * | 5/1999 | McKay | .................... | F01M 1/16 |
| 6,095,769 A * | 8/2000 | McKay | .................... | F01M 1/16 |
| | | | | 137/554 |
| 6,942,470 B1 * | 9/2005 | Versini | ................ | A47J 31/4403 |
| | | | | 417/307 |
| 9,816,496 B2 * | 11/2017 | Ott | ........................ | F04B 53/146 |
| 2017/0152992 A1 * | 6/2017 | Karlsson | ................. | F16N 13/16 |

FOREIGN PATENT DOCUMENTS

| | | | |
|---|---|---|---|
| EP | 0049603 | A2 | 4/1982 |
| EP | 2484875 | A1 | 8/2012 |
| WO | 2012126473 | A2 | 9/2012 |

OTHER PUBLICATIONS

Austrian Search Report Application No. A50763/2016 Completed Date: Mar. 17, 2017, 1 Page.

\* cited by examiner

LUBRICATION SYSTEM FOR PISTON MACHINES

TECHNICAL FIELD

The present invention refers to a lubricant injector with a lubricant inlet conduit and an outlet opening, through which a lubricant is delivered into the inner space to be lubricated of a piston machine, wherein the outlet opening may be selectively opened and closed by means of a needle valve, which is actuated through a magnetic coil, wherein the lubricant injector has a flow sensor suitable for determining the quantity of lubricant delivered through the outlet opening. The invention also refers to a lubrication system for a piston machine as well as a method for providing lubricant to a plurality of lubrication points of a piston machine with such a lubrication system.

BACKGROUND

In piston machines, in particular in lubricated compressors, a reliable lubrication in all lubrication points is extremely important for achieving a reliable operation. Usually, in each compressor package and in each cylinder one or more lubrication points are provided, which are supplied by a central lubrication system. The feeding of the lubrication points is usually provided by "pump-to-point" or "divider block" systems. In "pump-to-point" systems, the corresponding quantity of oil is directly supplied by the piston stroke of the respective pump element to the lubrication point. In the "divider block" system, the oil quantity supplied by the piston stroke of a central pump unit is divided by a so called "divider block" and supplied to the individual lubrication points.

However, known lubrication systems, in particular the "pump-to-point" systems, suffer from excessive inaccuracies in the setting of a low lubrication quantity.

An improved control of the lubricant supply may be obtained by lubrication systems with a common centrally pressure-controlled oil supply conduit, wherein the lubrication quantity is dosed for each lubrication point with a separate valve. Such a lubrication system is disclosed, for example, in EP 0049603 A2.

However, in such systems, besides the pressure controlled lubricant supply line, a leakage recirculation and/or overpressure-reducing line is required. This causes reliability problems and prevents a precise, controllable and monitored dosing of the lubrication quantity.

WO 2012/126473 A2 discloses a lubrication system for large cylinders, wherein, through lubricant injectors, lubrication oil is dosed into the cylinders. The system has a flow measurement for each lubricant injector.

EP 2484875 A1 discloses a lubrication system for large cylinders, wherein the quantity of lubrication oil provided by a lubricant injector is controlled by electromagnetic valves. In order to render the dosage independent from viscosity changes, the lubricant injectors are heated by heating elements.

Fundamentally, the lubricant quantity may be significantly reduced in almost all compressors, if it were possible to ensure that a reduced lubricant quantity securely reaches the lubrication point. However, the manufacturers of compressors keep themselves on the safe side and provide compressors with high lubrication rates. This causes high operating costs due to the lubricant consumption and problems with high oil quantities in the gas. This is particularly problematic in chemical plants and oil has to be onerously removed from the gas. In case of unmanned compressor stations in gas fields the lubrication oil has to be supplied the whole year long with corresponding high costs. In combustion machines, excessive lubricant quantities deteriorate in particular the combustion process and cause a higher emission of pollutants.

A reduction of the lubrication quantity is therefore desirable among other things also due to ecological and economic reasons. It is also desirable to be able to automatically adapt the lubrication quantity individually for each lubrication point to current load conditions or run-in processes.

SUMMARY

These and further objectives are achieved according to the invention by a lubricant injector of above mentioned type, which has a permanent magnet, which is movable along the flow direction, and which is subject to a restoring force, which acts against the flow direction, wherein outside the flow path in the magnetic field of the permanent magnet at least one measuring coil connected to the electronic unit is provided. The movement of the permanent magnet generates in the measuring coil (or in the plurality of measuring coils), by means of electromagnetic induction, a voltage, which may be evaluated by the electronic unit for determining the flow quantity. By measuring and evaluating the stroke of the permanent magnet, the result is essentially independent from viscosity and temperature.

The flow sensor may be advantageously positioned between the lubricant inlet conduit and the needle valve, in the flow path of the lubricant, whereby a compact arrangement is achieved.

Since the needle valve for injecting the lubricant is always opened only for a short period of time, and the lubricant injector is closed or inactive between the active phases of inflow until the subsequent active phase occurs (wherein the obtained flow is called "intermittent flow" in the following), the flow sensor may be a flow sensor suitable for determining the quantity of the lubricant intermittently flowing through the flow path. It is not necessary for the flow sensor to measure static flow processes, which allows a simpler construction of the flow sensor.

The electronic unit may advantageously have an analog/digital converter, which converts the measurement data provided by the flow sensor into a digital bit pattern.

The digital bit pattern may be transmitted during the passive phases of the magnet coil through a power supply line preferably of the two-wire type, provided for the magnet coil, to a central control unit of the lubrication system. Due to the conversion into a digital signal, the error proneness due to electromagnetic interference from the environment during the transmission is reduced to a minimum.

The needle valve may be advantageously subjected to closing force acting in the closing direction. This construction allows a very fast opening and closing of the needle valve, wherein the needle valve remains closed in the deactivated state.

A preferred embodiment consists in positioning a check valve between the flow sensor and the needle valve. This avoids faulty measurements by the flow sensor.

In this case, a valve spring of the check valve may advantageously simultaneously act on the needle valve for generating the closing force. This allows a simple assembly of the lubricant injector, wherein the number of components is minimized.

The needle valve may advantageously have an armature, which is positioned in an electromagnetic field of a magnet coil, wherein the magnet coil is positioned in a coil body, which is sealed from the lubricant. Due to the advantageous arrangement and construction of armature and coil body, which are described in the following, the provision of leakage recirculation may be omitted. This simplifies the structure and increases the precision of the flow measurement.

The coil body may be advantageously provided with a yoke, which is open towards the armature, wherein in the yoke opening a coil support is inserted. The yoke may be therefore made of a very stable material, preferably a metal, in particular steel, in order to allow a precise manufacturing or stable and sealing mounting in the lubricant injector. The yoke may optionally be integral with other components of the lubricant injector. The coil support is preferably made of a high-quality, readily machineable and heat-resistant plastic material, such as polyetheretherketone (PEEK).

In an advantageous embodiment, between the coil support and the yoke at least one inner sealing element and one outer sealing element may be provided. The sealing elements may preferably be O-rings. This allows a secure sealing of the magnet coil with respect to the lubricant, which, on one hand, avoids the provision of leakage recirculation and, on the other hand, is convenient for explosion protection.

The coil body may preferably have an annular shape, wherein the flow path extends through the center of the annular coil body. Besides a compact arrangement, this also allows a heating of the lubricant in the flow path, in that the magnet coil is subjected to electric currents of low intensity during the inactive phases. The current has to be so low, that the needle valve does not open. Due to heating of the lubricant, viscosity fluctuations may be compensated or avoided and the run-in processes may be improved.

As an alternative (or in addition to heating by the magnet coil), heating elements may be advantageously provided in the coil body for heating the lubricant. Such heating elements may be simple resistance elements or other controlled heating elements.

In order to further monitor the functionality of the lubricant injector, a temperature sensor inside the lubricant injector may be provided for measuring the lubricant temperature.

In a further advantageous embodiment, the outlet opening may form a flow screen. The screen flow obtained in this way is only minimally dependent on the viscosity, so that error sources due to viscosity deviations are reduced to a minimum.

The invention also refers to a lubrication system for a piston machine with a plurality of lubricant injectors according to the invention, wherein the lubrication system is provided, according to the invention, with a central pressure supply for a lubricant and a system of pressure conduits, which are connected to the lubricant inlet conduits of the lubricant injectors, for the lubricant, and wherein each lubricant injector is connected, through at least one power supply line, to a central control unit. Thus, the quantity of lubricant may be individually adjusted and monitored for each lubrication point.

The electronic units may advantageously be provided with an analog/digital converter, which converts the measurement data determined into a digital bit pattern, for transmission to the central control unit, whereby the transmission reliability is increased.

In a preferred embodiment, the electronic units of the lubricant injectors may use the preferably two-wire power supply line of the lubricant injector during inactive phases of respective lubricant injector as a communication line, whereby the installation cost for the lubrication system is minimized.

The invention also refers to a method for providing lubricant to a plurality of lubrication points of a piston machine equipped with above said lubrication system. According to the invention, the central control unit may selectively activate and deactivate, in a time-controlled way, the plurality of lubricant injectors, based on the measurement data obtained from the flow sensors, for delivering a defined quantity of lubricant. The timed control allows both the setting of the time of lubricant delivery and the quantity of lubricant input for each lubrication point, independently from each other.

Advantageously, in case of detection of a malfunction or an incorrect quantity of lubricant delivered by a lubricant injector, the central control unit may compensate the malfunction or incorrect quantity by increasing or reducing the quantity of lubricant delivered by at least another lubricant injector. Thus, damages due to a lack of lubrication, which may occur between the occurrence of a failure and the removal of the failure or the following maintenance, are avoided. The system may preferably send a warning to an operator, wherein concrete measures for failure elimination may also be suggested.

The central control unit may also individually adjust the quantity of lubricant delivered by each lubricant injector depending on the current load conditions and/or run-in processes, whereby the quantity of lubricant may be optimized for all these conditions.

In an advantageous embodiment, the central control unit may actively heat the lubricant contained in the lubricant injectors during the inactive phases, in particular in order to avoid errors due to viscosity fluctuations.

The heating may be performed by heating elements provided inside the lubricant injectors, or in that, for heating, a magnet coil provided inside the lubricant injector for actuating a needle valve is supplied with a current below the activation threshold.

The valve movements in the lubricant injectors may be preferably detected and monitored by the central control unit through evaluation of the armature current reaction. This is a particularly simple method, which may be implemented without additional sensor elements.

In a further advantageous embodiment, the central control unit may evaluate, in combination, the valve movement of each lubricant injector and/or measurement data provided by the flow sensors and/or the temporal variation of pressure peaks in the pressure conduit system and/or further sensor data of the lubrication system and/or of the piston machine, in order to optimally adapt the lubrication behavior to the respective operating conditions.

BRIEF DESCRIPTION OF THE DRAWINGS

The present invention is described in the following in further detail, by referring to FIGS. 1 to 10, which schematically illustrate advantageous exemplary and non-limiting embodiments of the invention. In particular

DETAILED DESCRIPTION

Figures 1A, 1B, 1C:
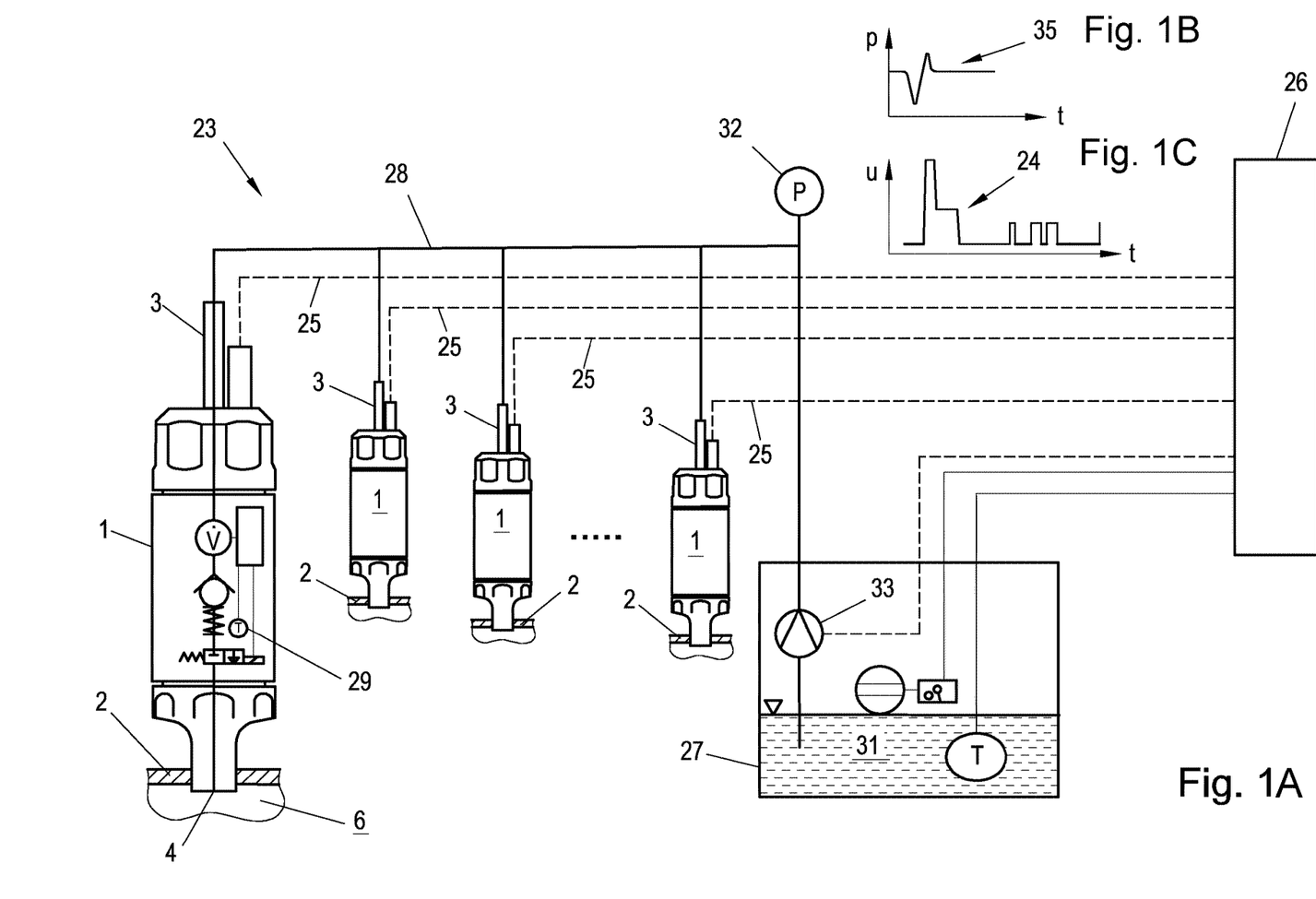
FIG. 1A-1C shows a circuit diagram of a lubrication system for a piston machine (1A), a pressure profile (1B), and a digital bit pattern (1C)

FIG. 1A shows an exemplary embodiment of a lubrication system 23 according to the invention, as a schematic circuit diagram. The lubrication system 23 comprises a plurality of lubricant injectors 1, which are positioned at different positions of a piston machine 2, and which may deliver, through an outlet opening 4, a lubricant into an inner space 6, to be lubricated, of the piston machine 2. The inner space may be the cylinder chamber of the piston machine 2 or the region of a sealing package in a sliding or radial bearing of the piston machine 2. The regions around the outlet openings 4 are also generally called lubrication points.

A central pressure supply 27 supplies a pressure conduit system 28 with lubricant from a lubricant reservoir 31, generates through a feeding pump 33 a desired and required pressure in the pressure conduit system 28 and maintains the same pressure. Each lubricant injector 1 has a lubricant inlet conduit 3, which is connected to the pressure conduit system 28.

The pressure in the pressure conduit system 28 is measured and monitored by a central control unit 26 through a pressure measuring unit 32, wherein the adjustment of the feeding pump 33 is also performed by the central control unit 26. Through the pressure measuring unit 32, the central control unit 26 may also detect and evaluate pressure fluctuations in the pressure conduit system 28, for example, for a timely detection of malfunctions.

The central control unit 26 is also connected through a respective power supply line 25 with each lubricant injector 1. In order to activate a lubricant injector 1, a supply current for opening one needle valve 5 provided in the lubricant injector 1 is applied to the corresponding power supply line 25 by the central control unit 26. Since at each activation only a small quantity of lubricant has to be delivered through the outlet opening 4, the activation is performed as a current pulse, whose duration determines the respective quantity emitted. The instant and the duration of the supply current pulse may be defined by the central control unit 26 for each lubricant injector 1 independently from each other.

Figure 2:
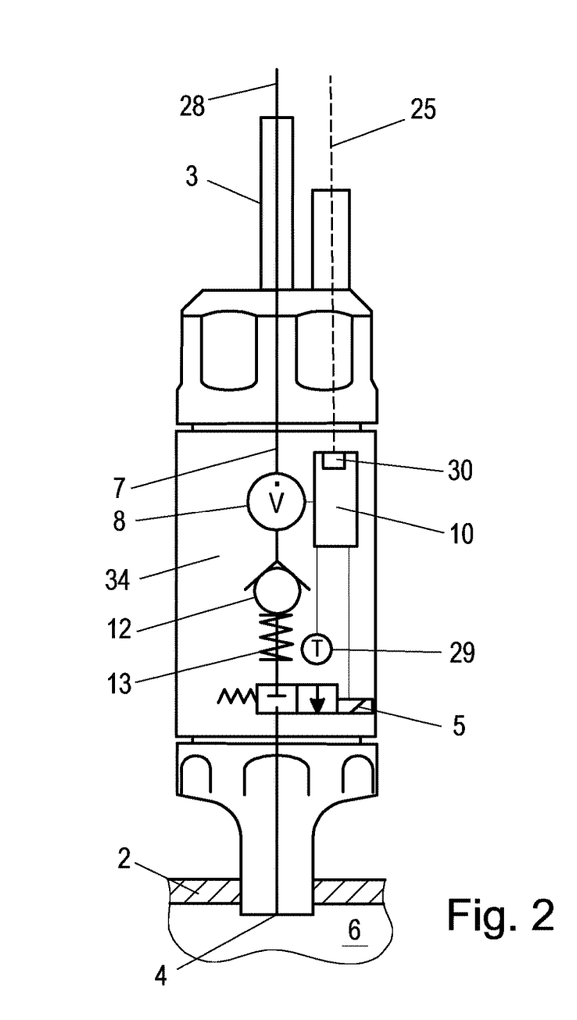
FIG. 2 shows a schematic representation of an injector.

The structure of the lubricant injector 1 is schematically shown in FIG. 2. The lubricant injector 1 comprises an injector housing 34, which is essentially cylindrical, in which, between the lubricant inlet conduit 3, which is connected to the pressure conduit system 28, and the output opening 4, a flow path 7 for lubricant is defined. In the flow path 7 a flow sensor 8, a check valve 12 and the needle valve 5 are disposed. Moreover, the temperature of the lubricant may be measured at a suitable position in the lubricant injector 1 by means of a temperature sensor 29. An electronic unit 10, which is connected to the power supply line 25, is connected to the flow sensor 8, the needle valve 5 and the temperature sensor 29.

Supply current pulses which are supplied by the central control unit 26 to the power supply line 25, for actuating the needle valve 5, are directly forwarded by the electronic unit 10 to the electromagnetic actuation element of the needle valve 5, wherein the electromagnetic actuation element preferably is a magnet coil 14, which activates the armature 15 of the needle valve 5 (a detailed embodiment is explained in the following in relation with the description of FIG. 5). While the needle valve 5 is activated or open, lubricant flows from the pressure conduit system via the flow path 7 and through the outlet opening 4 into the inner space 6 of the piston machine 2, wherein FIG. 2 only schematically shows an outer wall of piston machine 2. The quantity of lubricant delivered for each activation is detected by the flow sensor 8 and processed by the electronic unit 10. The electronic unit 10 has an analog/digital converter 30, which converts measurement data for each activation into a digital bit pattern 24 (FIG. 1C). The digital bit pattern 24 is temporarily stored in the electronic unit 10 during the active phase (in which the power supply line 25 is used for supplying power to the magnet coil 14) and is transferred in the following deactivated phase through the power supply line 25 to the central control unit 26. The central control unit 26 is therefore provided with a feedback about the actual quantity of lubricant delivered during a supply current pulse for each lubricant injector 1. The values measured by the temperature sensor 29 may also be transmitted by the electronic unit 10 in a binary or analog form to the central control unit 26. Similarly, also data, for example, instructions, calibration data, and/or control commands may be transmitted from the central control unit 26 to the individual lubricant injectors 1.

The use of the power supply line 25 represents, due to the simple cabling, a particularly preferred embodiment, wherein the communication between the central control unit 26 and the electronic units 10 may be performed through own communications lines or wireless connections. Such communication solutions are known to the skilled in the art in similar technical fields, in particular in the field of the compressor and motor technology.

The central control unit 26 (FIG. 1A) is therefore provided with detailed, precise and updated information regarding the quantity of lubricant delivered by each lubricant injector 1, the temperature conditions inside the individual lubricant injectors 1 and the pressure profile 35 (1B), measured by the pressure measuring unit 32, inside the pressure conduit system 28.

The pressure in the pressure conduit system 28 has, for each individual lubrication process of a lubricant injector 1, a characteristic pressure profile 35, which is generally characterized by a pressure drop caused by the opening of the needle valve 5, followed by a brief pressure increase caused by the closing of the needle valve.

The temperature measurement in the lubricant injector 1 allows, besides an increased explosion protection, also the taking into account of viscosity variations, for example, by compensating such viscosity fluctuations or by targeted measures for influencing the viscosity of the lubricant, such as a preheating of the lubricant in the flow path 7 of lubricant injector 1, for example by means of heating elements positioned in the lubricant injector 1 or by supplying a small current to the measuring coil 11 during the inactive phase, so that the coil is warmed up without the needle valve 5 opening yet.

During the active phase, the central control unit 26 may also evaluate the armature current reaction of the armature, which is moved inside the magnetic field of the measuring coil 11, whereby precise data regarding the movement of the needle valve 5 in each lubricant injector 1 may be generated.

By means of a logical connection of data regarding the delivered quantity of lubricant at each lubrication point, the movement of the injector needle of each lubricant injector 1, the lubricant temperature in each lubricant injector 1 and/or the pressure peaks in the pressure conduit system, various failure modes may be deduced, such as, for example, an obstructed oil supply conduit, the failure of individual lubricant injectors 1, etc.

This failure detection also allows an automatic adaptive control, which causes an increase of the reliability and safety of the entire system. Thus, for example, in case of detection of a failure in a lubricant injector 1 on a cylinder with a plurality of lubrication points, the function of the faulty lubricant injector 1 may be compensated by the other lubricant injectors 1 by adaptive adjustment of the injected lubricant quantity of remaining lubricant injectors 1.

Figure 3:
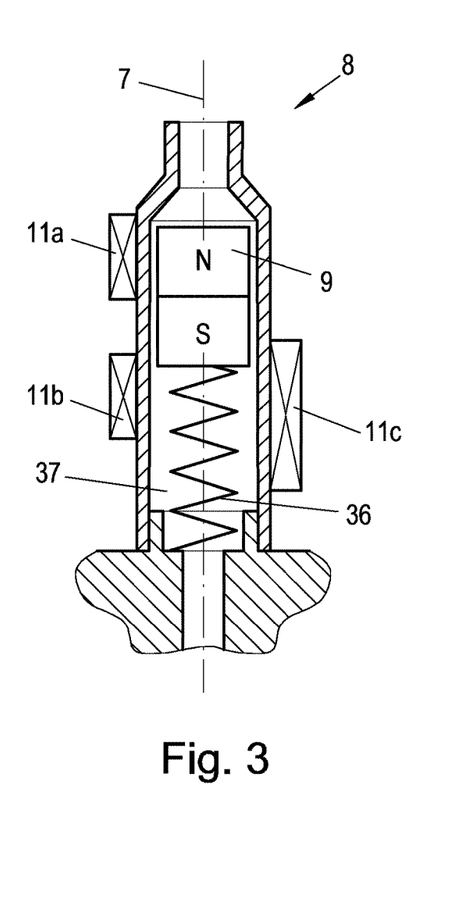
FIGS. 3 and 4 show schematic representations of a flow sensor in a plurality of embodiments.
Figure 4:
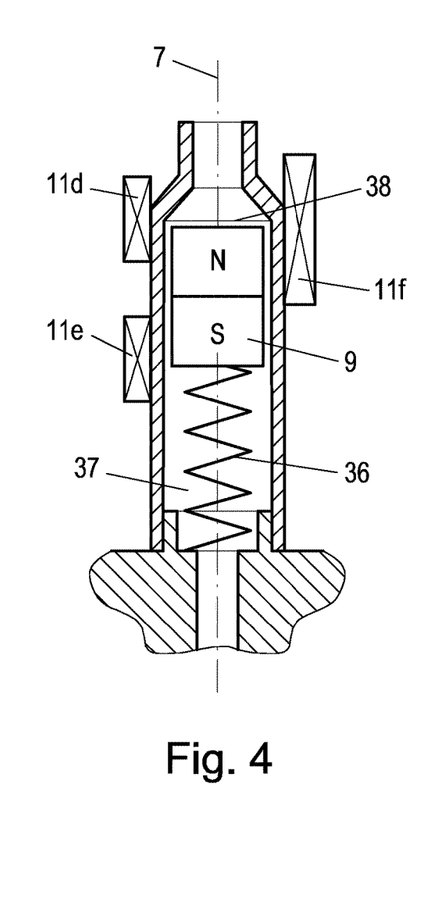

A suitable flow sensor 8, which may be used in the lubricant injector 1, is illustratively shown in various embodiments in FIGS. 3 and 4.

In an expanded region 37 of the flow path 7, a permanent magnet 9 is positioned so that it may be moved along the flow direction. The permanent magnet 9 is biased by a return spring 36 towards an end position defined by an abutment 38, in which the permanent magnet 9 closes the flow path 7. In case of a fault, the permanent magnet 9 is pressed against the return force of the return spring 36 away from the abutment 38, so that lubricant may flow laterally along the permanent magnet 9. As soon as no lubricant flows through flow path 7, the permanent magnet 9 is pressed again by the return spring 36 into the end position.

The movement of the permanent magnet 9 may be detected by means of one or more measuring coils 11, which are connected to the electronic unit 10, based on the voltage induced by the one or more measuring coils 11. FIGS. 3 and 4 show various different possible solutions for positioning the measuring coils 11 (wherein the individual positions are indicated by reference numerals 11*a*-11*f* in FIGS. 3 and 4), in order to measure the movement, wherein in each figure on the right and left side two different embodiments are shown, respectively. Thus, FIGS. 3 and 4 show four different embodiments.

The representation on the left side of FIG. 3 shows two measuring coils 11*a* and 11*b*, wherein the first measuring coil 11*a* is positioned in the region of the end position of the permanent magnet 9 around the expanded region 37 and the second measuring coil 11*b* is positioned underneath the permanent magnet in a region, into which the permanent magnet 9 moves only when a flow of lubricant occurs.

The representation on the right side of FIG. 3 shows only a single coil 11*c*, which is in a slightly overlapping position with respect to the permanent magnet 9, and which comprises a region, in which the permanent magnet 9 is pressed in case of flow.

FIG. 4 shows, on the left side, an arrangement with two measuring coils 11*d* and 11*e*, which, however, in contrast to the left side of FIG. 3, are both positioned in an overlapping arrangement with respect to the permanent magnet, and on the right side of FIG. 4 an arrangement of a single measuring coil 11*f* in the region of the end position of the permanent magnet is shown, wherein the permanent magnet 9, in case of flow, is moved away from the region comprised by the measuring coil 11*f*.

In each case, the movement of the permanent magnet 9 may be precisely measured by means of the one or more measuring coils 11 and may be evaluated for determining the quantity of lubricant flowing at each flow pulse.

The flow measurement described above is suitable, in this form, for dynamic flow profiles only, therefore in particular for intermittent liquid streams, such as those occurring in the present case, at each opening of the needle valve 5. Since during an active phase, always only a small quantity of lubricant is delivered through the lubricant injector 1, the permanent magnet 9 cannot maintain a stable position except for the end position, since this would only be possible in case of steady flows.

Figure 5:
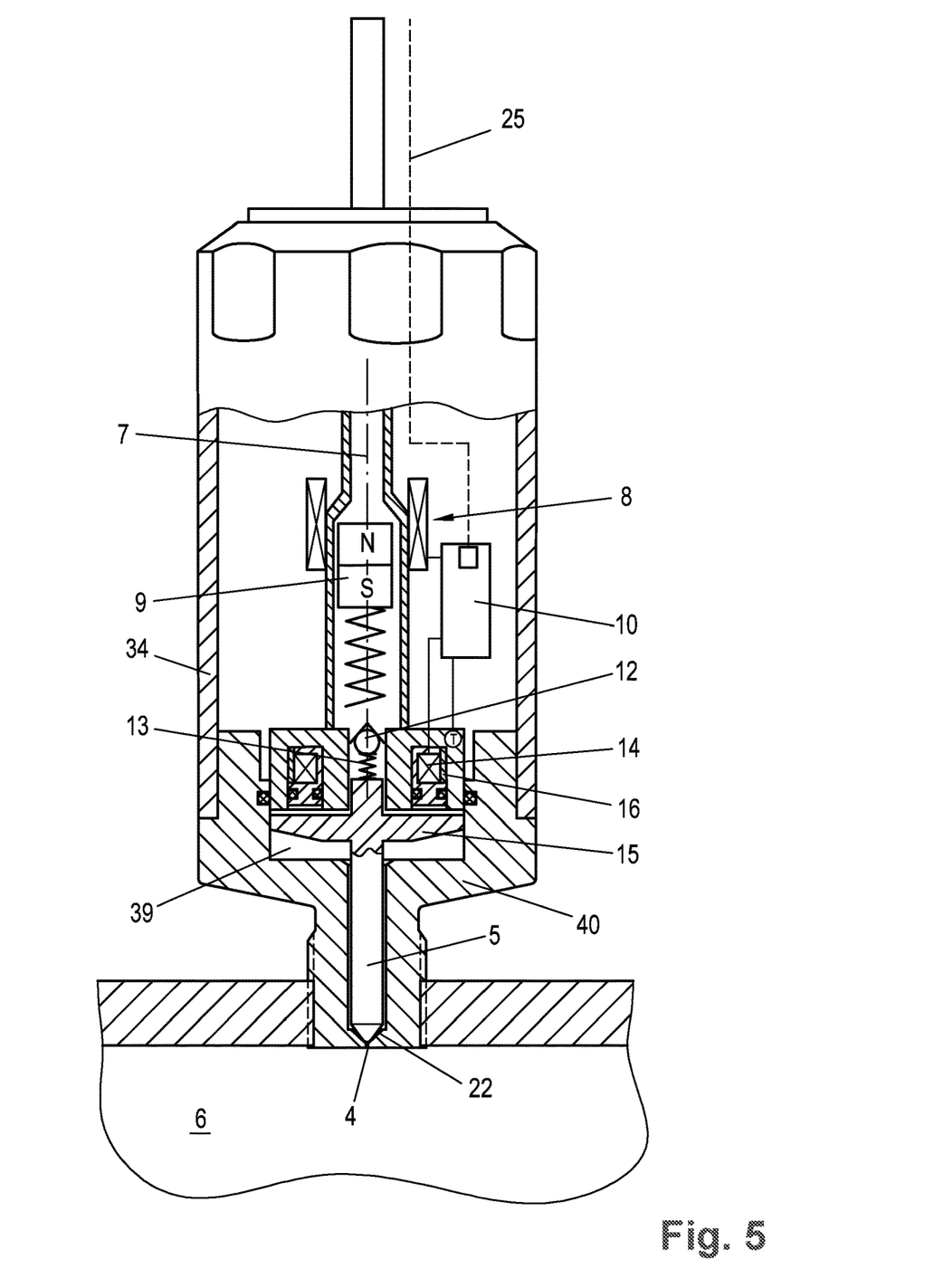
FIG. 5 shows a sectional view of an injector.

FIG. 5 shows a cross-sectional view of an inventive embodiment of the lubricant injector 1, wherein a detailed explanation of already described characteristics is omitted. The characteristics described in the following are independent from the embodiment of the flow sensor and may also be used in lubricant injectors, which do not have a flow sensor, or whose flow sensor is different from above said embodiment.

The flow path 7 essentially extends along the main axis of the cylindrical injector housing 34, wherein, in a downstream position with respect to the flow sensor 8, a check valve 12 is provided. The check valve 12 is formed, in a known manner, by a spherical body, which is biased by a valve spring 13 against the flow direction against a valve seat.

Approximately in the region of the check valve 12, a coil body 16 is positioned around the flow path 7, wherein, in the coil body, the magnet coil 14 for the needle valve 5 is housed. Beneath the coil body an armature space 39 is provided, in which an armature 15 connected to the needle valve 5, shaped as a disc or plate, is positioned. The armature 15, and thus the needle valve 5, is biased by the valve spring 13 away from the coil body 16 and to the closing position. The valve spring 13 is the same spring used for providing the opposing restoring force for the check valve 12. The valve spring 13 thus engages in both directions both the check valve 12 and the needle valve 5.

If a sufficiently high supply current flows through the magnet coil 14, then the armature 15 is drawn against the elastic force of the valve spring 13 by the magnet coil 14, and the needle valve 5 connected to the armature 15 is lifted from the valve seat, which is positioned in the region of the outlet opening 4, clearing the outlet opening 4, so that lubricant may flow from the flow path 7 into the inner space 6 of the piston machine 2.

The valve seat of the needle valve is provided in the form of a flow screen 22, wherein the flow diameter is reduced stepwise from a relatively large diameter in the region around the needle valve 5 to a relatively small diameter in the region of the outlet opening 4. The pressure drops thus generated in the region of the flow screen 22 generate a screen flow, which only slightly depends on the viscosity. The viscosity independence is thus improved.

The coil body 16 and the needle valve 5 with the armature 15 are positioned in a portion of the injector housing 34, which is formed by an inlet connector 40, and by which the lubricant injector 1 is installed into a mounting opening provided to this end on the piston machine 2. The coil body 16 is sealed against the inlet connector 40, so that the lubricant flowing underneath the coil body 16 around the armature 15 cannot penetrate into the region above the coil body 16. This region inside the injector housing 34 above the coil body 16 is thus free from lubricant and provides a space for a protected positioning of the electronic unit 10 inside the injector housing 34.

FIGS. 6 to 10 show preferred embodiments of the coil body 16. This is generally provided with an essentially annular yoke 17, which is positioned around the flow path 7. The yoke is preferably composed of a solid material, such as steel, and is mounted in a sealed relationship with respect to adjacent components (such as the outer wall of the flow path 7 on the inner side and the inlet connector 40 or the injector housing 34 on the outer side—see FIG. 5). The yoke 17 may optionally be integrally formed with the conduit defining the flow path 7, or with the housing.

On the lower side of yoke 17 facing the armature 15 a receiving groove 41 is provided, in which a coil support 18 is inserted. The coil support 18 is preferably made of a suitable plastic material, such as PEEK. The magnet coil 14 is positioned on the coil support 18, wherein the open side of the coil winding of magnet coil 14 is protected by a protection ring, preferably made of the same or a different plastic material.

In order to protect the magnet coil 14 against penetration of lubricant, at least one inner sealing element 19 and one outer sealing element 20 are positioned between the coil support 18 and the yoke 17, wherein simple O-rings may be advantageously used, which are inserted into corresponding sealing grooves.

Due to this simple structure, the penetration of lubricant into the coil support 18 may be reliably avoided, whereby a certification according to specific explosion safety standards may be obtained, without the need for a complex casting of the magnet coil 14 into a plastic enclosure, as conventionally foreseen.

Figure 6:
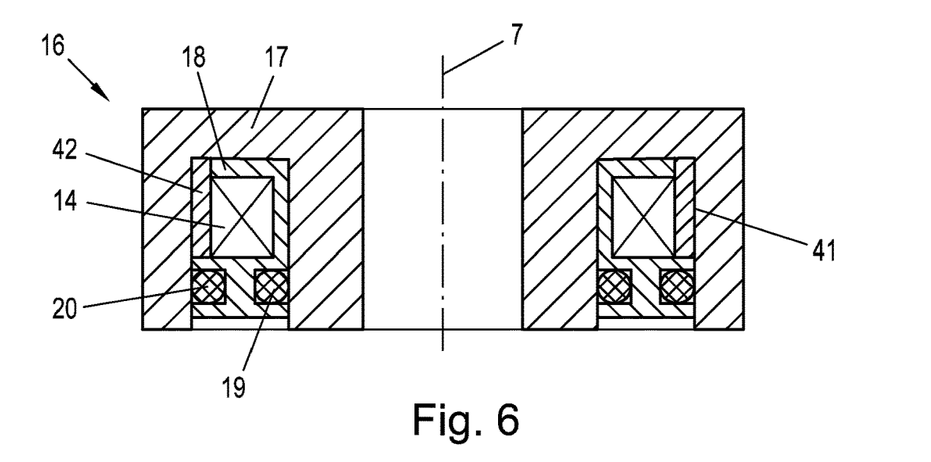
FIGS. 6 to 10 show schematic sectional views of the coil body for actuating the needle valve of a lubricant injector.
Figure 7:
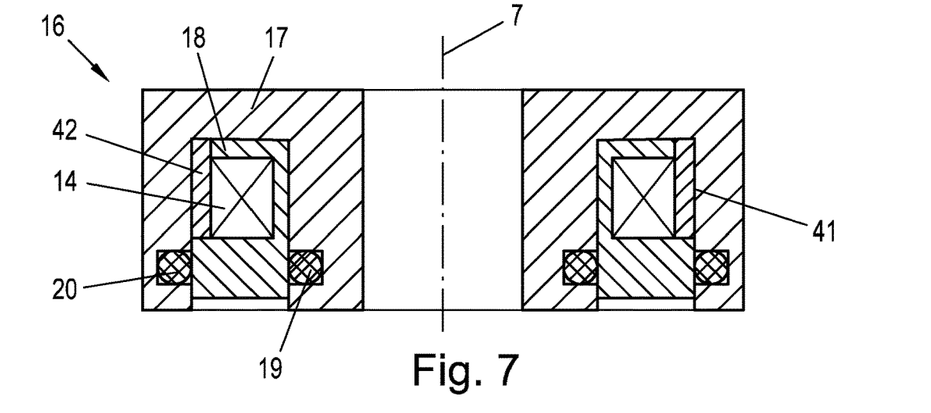
Figure 8:
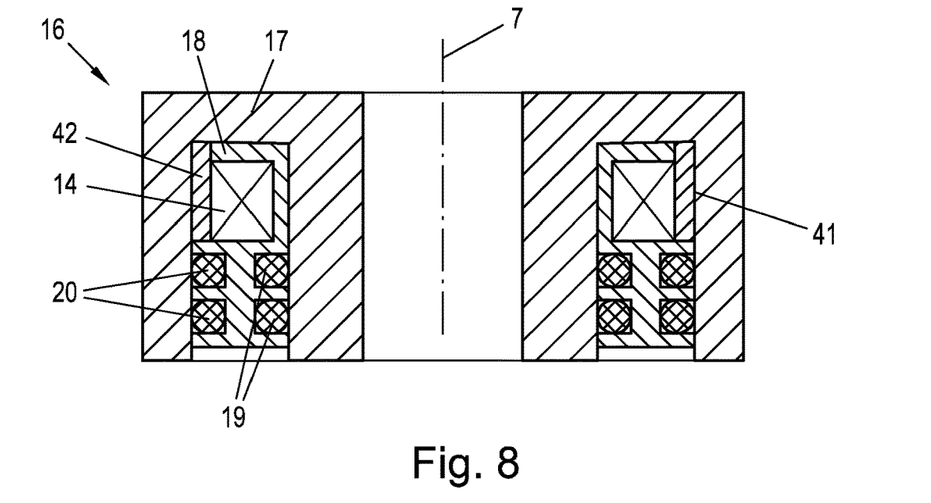
Figure 9:
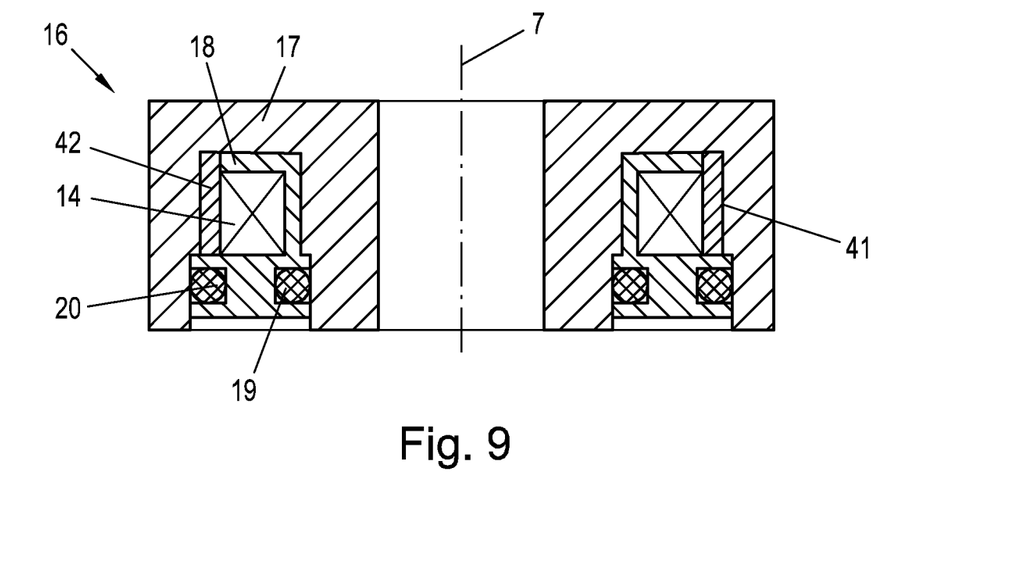

The sealing elements 19, 20 may be positioned in different ways. FIG. 6 shows two O-ring-shaped sealing elements 19, 20, which are inserted into sealing grooves, which are provided on the outer and inner side on the coil support 16. The sealing grooves may also be provided in the yoke 17, as shown in FIG. 7. FIG. 8 shows an embodiment with four O-ring-shaped sealing elements, wherein two sealing grooves are respectively provided on the outer and inner side of the coil support 18. FIG. 9 shows an embodiment with a stepped receiving groove 41.

Figure 10:
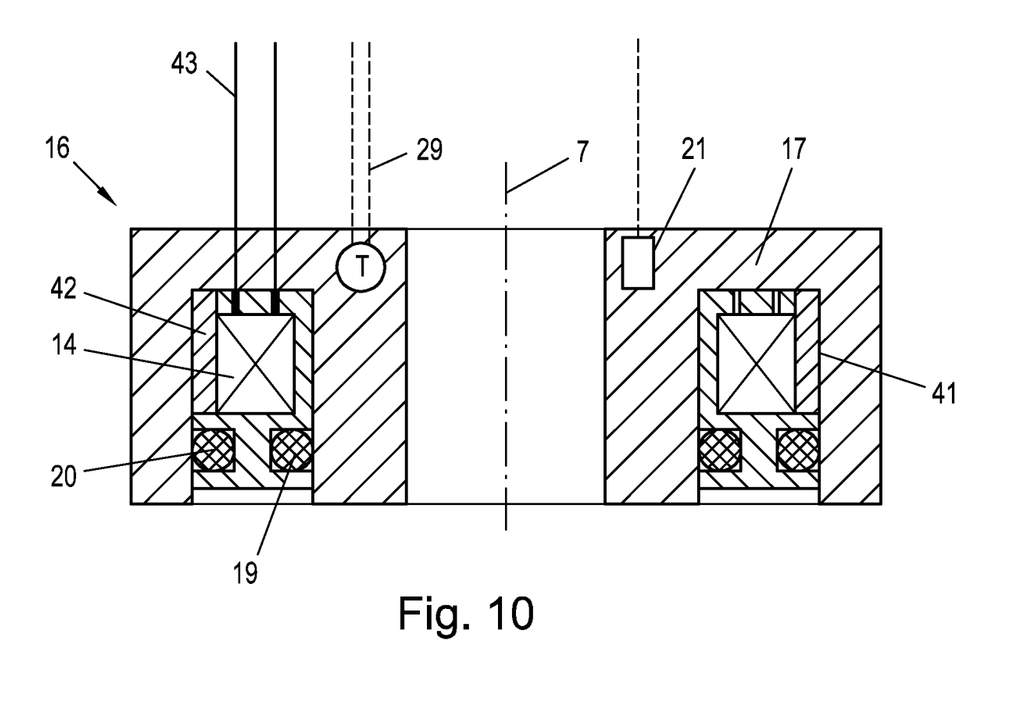

FIG. 10 shows a coil body 16 according to FIG. 6, wherein the supply lines 43 for the magnet coil 14 are shown. The supply lines 43 extend through a hole in the yoke 17 to the electronic unit 10.

FIG. 10 also shows a temperature sensor 29 and a heating element 21 provided in the region of the inner side of yoke 17, near the flow path 7.

The invention claimed is:

1. A system for injecting lubricant comprising:
   an injector including an inlet conduit and an outlet opening,
   the outlet opening including a needle valve having an open position and a closed position;
   wherein in the open position, lubricant flows in a single direction from the inlet conduit to the outlet opening along a flow path;
   a sensor having a magnet and a measuring coil, the magnet positioned in the flow path and connected to a return spring;
   the measuring coil is configured to provide a measurement indicative of a position of the magnet.

2. The system of claim 1 further comprising an electronic unit and a control unit, said electronic unit having an analog to digital converter for converting the measurement and transmitting the measurement to the control unit.

3. The system of claim 1 wherein the measurement is indicative of a throughput.

4. The system of claim 3 further comprising:
   a plurality of injectors;
   a lubricant supply;
   a conduit system connecting the lubricant supply to the inlet conduit of the plurality of injectors;
   wherein the lubricant supply is pressurized, and the conduit system is pressurized.

5. The system of claim 4 further comprising:
   a power supply;
   a power line extending along the conduit system from the power supply to a control unit;
   wherein the control unit adjusts the amount of lubricant an injector of the plurality of injectors delivers based on the measurements from the sensor.

6. A method for providing lubricant to a plurality of lubrication points of a machine comprising:
   providing the system of claim 5;
   supplying lubricant to each of the plurality of injectors;
   measuring pressure in the conduit system;
   measuring throughput in each of the plurality of injectors; and
   activating and deactivating each of the plurality of injectors based on sensor measurements.

7. The method of claim 6 further comprising:
   detecting a malfunction in one of the plurality of injectors; and
   compensating for said malfunction by increasing or decreasing a quantity of lubricant delivered by at least one other injector.

8. The method of claim 6 further comprising detecting and monitoring a movement of at least one of the needle valve and a check valve inside the injectors.

9. The method of claim 6 further comprising heating the lubricant in the injectors.

10. The method of claim 9 wherein the heating is done by heating elements.

11. The method of claim 10 wherein the heating is done by the magnetic coil supplied with current.

12. The system of claim 1 further comprising a temperature sensor for measuring a temperature of lubricant inside the injector.

13. The system of claim 1 further comprising a magnetic coil that actuates said needle valve to the open position.

14. The system of claim 13 further comprising a check valve between the needle valve and the sensor.

15. The system of claim 14 further comprising a spring positioned against the check valve for moving the needle valve to the closed position.

16. The system of claim 13 further comprising an armature and a coil body, the armature connected to the needle valve and positioned within an electromagnetic field of the magnetic coil, wherein the magnetic coil is positioned in the coil body, and wherein the coil body is sealed.

17. The system of claim 16 wherein the coil body has an annular shape, and wherein the flow path extends through the center of the annular coil body.

18. The system of claim 16 further comprising heating elements in the coil body for heating lubricant in the injector.

19. The system of claim 16 wherein the coil body incudes a yoke having an opening facing the armature, wherein a coil support is in the opening of the yoke.

20. The system of claim 19 further comprising at least one inner sealing element provided between the coil support and the yoke and at least one outer sealing element provided between the coil support and the yoke;
   wherein the inner sealing element is a first distance from the flow path;
   wherein the outer sealing element is a second distance from the flow path; and
   wherein the first distance is less than the second distance.

21. The system of claim 20 wherein the inner sealing element comprises an O-ring and the outer sealing element comprises an O-ring.

22. The system of claim 1 wherein the outlet opening forms a flow screen having a reduction of a diameter of the outlet opening for receiving the needle valve.

23. A system for injecting lubricant comprising:
   an injector including an inlet conduit and an outlet opening;
   a pressurized lubricant supply;

a pressurized conduit system connecting the lubricant supply to the injector;

the outlet opening including a needle valve having an open position and a closed position, such that in the open position lubricant flows in a single direction from the inlet conduit to the outlet opening along a flow path;

a sensor having a magnet and a measuring coil, the magnet positioned in the flow path and connected to a return spring, the measuring coil configured to indicate a position of the magnet.

* * * * *